UNITED STATES PATENT OFFICE.

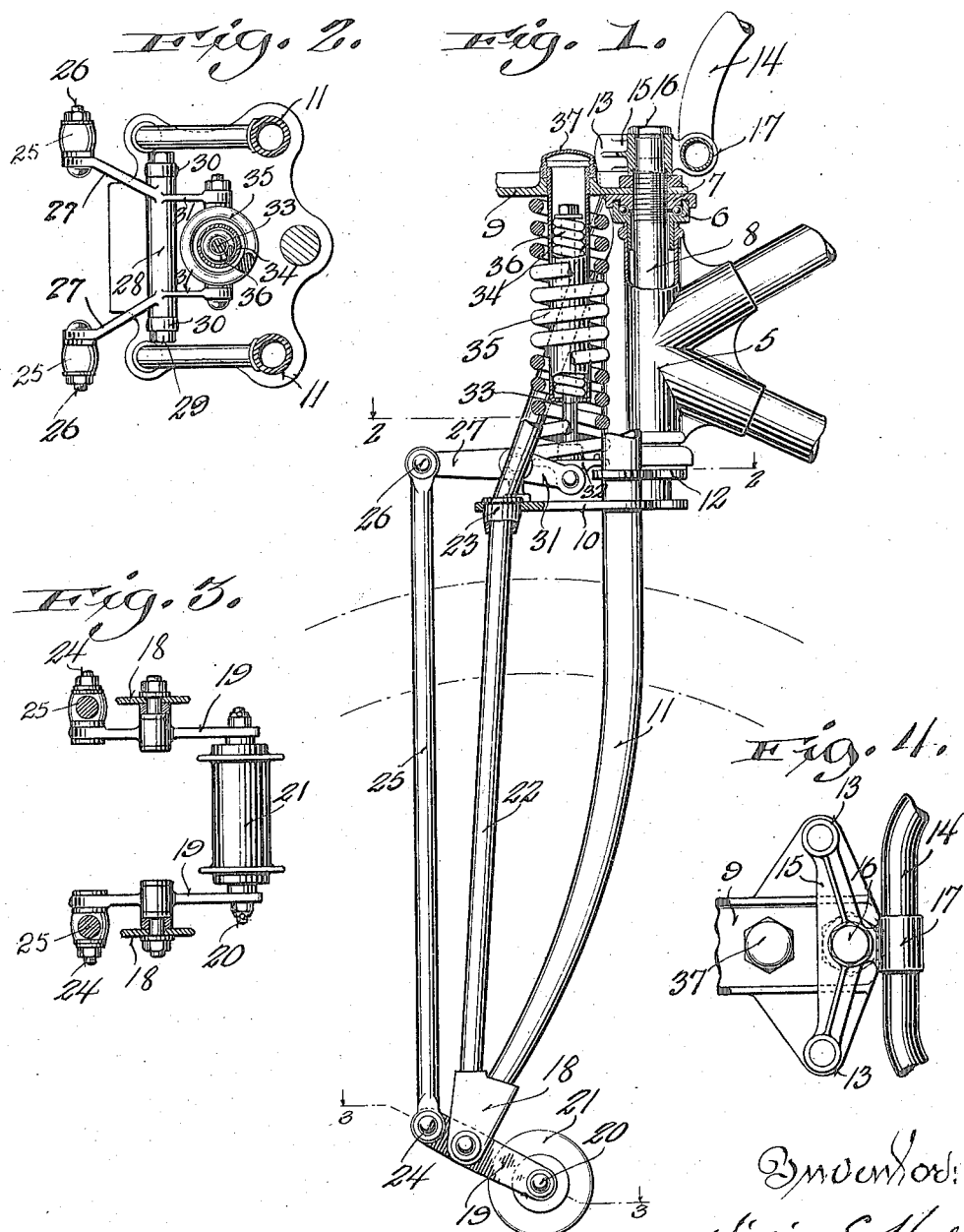

WILLIAM S. HARLEY, OF MILWAUKEE, WISCONSIN, ASSIGNOR TO HARLEY-DAVIDSON MOTOR CO., OF MILWAUKEE, WISCONSIN.

SPRING MOTOR-CYCLE FORK.

1,254,798.     Specification of Letters Patent.     Patented Jan. 29, 1918.

Application filed June 29, 1917. Serial No. 177,701.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Spring Motor-Cycle Forks; and I do hereby declare that the following is a full, clear, and exact description thereof.

My invention relates to new and useful improvements in spring forks for wheels and is more particularly directed to the front wheel forks of motor-cycles of a relatively light type.

A considerable disadvantage of relatively light motor-cycle fork structures embodying a spring connection between the wheel carrying means and the main vehicle frame, and particularly in connection with the usual leaf spring type has been that a lateral twisting is permitted which results in a wabbling tendency of the wheel.

It is therefore primarily the object of my invention to provide a spring fork arrangement wherein the hub carrying means and the frame are resiliently connected in a manner which positively prevents any relative lateral twisting.

A further and more specific object resides in the provision of a spring fork structure of the present nature which is exceedingly simple, strong and durable in nature.

With the above and other objects and advantages in view, the invention resides more particularly in the novel combination, formation and arrangement of parts hereinafter described and pointed out in the appended claims.

In the drawings:

Figure 1 is a side elevational view of a front wheel fork embodying my present invention, the upper portion of the structure being broken away.

Fig. 2 is a horizontal sectional view therethrough on the line 2—2 of Fig. 1.

Fig. 3 is a horizontal sectional view on the line 3—3 of Fig. 1.

Fig. 4 is a plan view of the fork.

Referring now more particularly to the accompanying drawings, 5 designates the usual head post of the front end of the motor-cycle structure, into the ends of which are fitted the usual ball race bearing sleeves 6 coacting with bearing collars 7 threaded on the usual pivot shaft 8 of the fork. Secured on the shaft immediately above the upper ball race 7 is the top head plate 9 of the fork structure, and secured on the lower end of the shaft is the bottom plate 10 and passed through these plates are the upper portions of main fork bars 11 which are welded or otherwise rigidly secured thereto and to an intermediate plate 12 connecting the fork bars and pivot shaft and disposed immediately below the lower bearing collar 7. The main fork bars extend above the upper plate 9, and fit within the end sleeves 13 of the head piece of the handle bars 14, this head piece including an intermediate sleeve 15 fitting on the upper projected end of the pivot shaft 8 and retained by the nut 16, and including also a rearwardly projecting sleeve 17 receiving the handle bars.

The lower ends of the main fork bars which are forwardly curved in a slight arc are secured to end plates 18 which are pivoted to levers 19 adjacent their forward ends, and said levers carry at their rear ends the axle 20 of the wheel hub 21. Also secured to the end plates 18 and extending vertically are supplemental fork bars 22 and these fork bars are passed through and preferably welded in securing sleeves 23 in the forward corners of the lower head plate 10 and are then inclined inwardly and welded or otherwise secured to the main fork bars immediately below the upper head plate 9. Thus the head plates and fork bars are mutually braced to provide a relatively rigid structure.

For resiliently supporting the wheel carrying levers 19, pivot pins 24 are passed through the forward ends of said levers and through the lower ends of vertically extending links 25 which have their upper ends enlarged for the reception of pivot pins 26 passed through the outer ends of levers 27 which extend divergently forwardly from a sleeve 28 mounted on a shaft 29 journaled in upstanding bearing arms 30 on the forward portion of the lower head plate 10. Arms 31 extend inwardly from the sleeve and pivotally carry a spring seating plate 32 which has secured centrally thereto a stem 33 projecting into a sleeve 34 carried by and depending from the upper head plate 9. Disposed about the sleeve and bearing against the plate 32 and against the top head plate 9 is a coil spring 35 and disposed within the sleeve and bearing against the closed lower end thereof and against the headed upper end of the stem 33 is a second coil spring 36. The upper end of this sleeve is open to permit assembly of the stem and spring, and said upper end is threadedly passed through the top head plate 9 and threadedly receives a closure cap 37.

By the foregoing arrangement, embodying the relatively fixed connections afforded by the pair of pivot pins 24 and the pair of pivot pins 26 carried by the rigid arms of a common rocker member, relative vertical movements of the pivots at the sides of the wheel are positively prevented, to consequently prevent any tilting or wabbling movement of the wheel.

It will be further noted that the pivots of the levers 19 and of the single lever comprising the sleeve 28 and its arms are so arranged that a maximum amount of pivotal movement of the wheel carrying ends of the levers 19 is procured with a minimum movement of the arms 31 of the sleeve 28 which are considerably shorter than the arms 27. Thus, the lateral movement of the spring seating plate 32 incidental to movement of the levers 19 is so comparatively slight as to eliminate the necessity of guide means for the springs and stem other than that afforded by the single rigid sleeve 34.

What is claimed is:

1. A spring fork structure comprising the combination with a frame and fork bars carried thereby, of levers pivoted to the lower ends of the fork bars, a wheel carried by said levers, a member rotatably carried by the frame, divergent arms extending forwardly from said member, links pivoted to said arms and said levers, arms extending rearwardly from said rotatable member, a spring seating plate carried by said arms and a spring bearing against said plate and a portion of the frame.

2. A spring fork structure comprising the combination with a frame and fork bars carried thereby, of levers pivoted to the lower ends of the fork bars, a wheel carried by said levers, vertically spaced members carried by the frame, a single lever pivoted to the lower member, links pivoted to the first named levers and said single lever, a sleeve depending from the upper frame carried member, a spring surrounding the sleeve, a plate carried by the single lever and seating said spring, a stem extended from the plate into the sleeve and headed therewithin, and a spring disposed about the stem within the sleeve.

3. A spring fork structure comprising a frame including a head post, a fork pivot shaft journaled in said post, forwardly projecting plates secured to the upper and lower portions of said shaft, main fork bars passed through said plates, supplemental fork bars connected with the lower ends of the main fork bars and passed through the lower plate and inclined inwardly and secured to the main fork bars adjacent the upper plate, levers pivoted to the connected lower ends of the fork bars, a single lever pivoted on the lower plate, links pivoted to said first named levers and the single lever, and a spring disposed between the single lever and the upper plate.

4. A spring fork structure comprising the combination with a frame and of fork bars carried thereby, of levers each pivoted adjacent one end to the fork bars, a wheel carried by the long arms of the levers, a common lever pivoted above the wheel and including relatively long arms and a short arm, links connecting the long arms of the second lever and the short arms of the first levers, and a spring connected with the frame and with the short arm of the second lever.

5. A spring fork structure comprising the combination with a frame and fork bars carried thereby, of a wheel, means for mounting said wheel on the lower ends of said fork bars, a member rotatably carried by the frame, links pivoted to said member at one end, their other ends being connected with the lower end of the fork bars, a sleeve carried by said frame, a spring seating plate carried by said member, and a spring surrounding said sleeve, one end of said spring bearing against said spring seating plate and the other end against a portion of said frame.

6. A spring fork structure comprising the combination with a frame and fork bars carried thereby, of a wheel carried by the lower ends of said fork bars, a member rotatably carried by the frame, links pivoted to said member at one end, their other ends being connected with the lower end of the fork bars, a sleeve carried by said frame, a spring seating plate carried by said member, a stem extending from the plate into the sleeve and headed therewithin, and a spring disposed within the sleeve and surrounding said stem, one end of said spring engaging the head of said stem and the other end contacting with the end of said sleeve.

7. A spring fork structure comprising the combination with a frame and fork bars carried thereby, of a wheel carried by the lower ends of said fork bars, a member rotatably carried by the frame, links pivoted to said member at one end, their other ends being connected with the lower end of the fork bars, a sleeve carried by said frame, a spring seating plate carried by said member, a stem extending from the plate into the sleeve and headed therewithin, a coil spring surrounding said sleeve, one end of said spring bearing against said plate and the other end against a portion of the frame, and a second spring disposed within the sleeve and surrounding said stem, said second spring being disposed between the head on said stem and one end of said sleeve.

In testimony that I claim the foregoing I have hereunto set my hand at Milwaukee, in the county of Milwaukee and State of Wisconsin.

WILLIAM S. HARLEY.